US010510347B2

(12) United States Patent
Yamaguchi et al.

(10) Patent No.: US 10,510,347 B2
(45) Date of Patent: Dec. 17, 2019

(54) LANGUAGE STORAGE METHOD AND LANGUAGE DIALOG SYSTEM

(71) Applicants: TOYOTA JIDOSHA KABUSHIKI KAISHA, Toyota-shi (JP); Tokyo Metropolitan University, Shinjyuku-ku (JP)

(72) Inventors: Toru Yamaguchi, Hachioji (JP); Eri Shimokawara, Hachioji (JP); Kazuki Hirata, Yokohama (JP); Tomoya Takatani, Nissin (JP)

(73) Assignees: TOYOTA JIDOSHA KABUSHIKI KAISHA, Toyota-shi (JP); Tokyo Metropolitan University, Shinjyuku-ku (JP)

( * ) Notice: Subject to any disclaimer, the term of this patent is extended or adjusted under 35 U.S.C. 154(b) by 0 days.

(21) Appl. No.: 15/834,129

(22) Filed: Dec. 7, 2017

(65) Prior Publication Data
US 2018/0166077 A1    Jun. 14, 2018

(30) Foreign Application Priority Data
Dec. 14, 2016    (JP) .................. 2016-242297

(51) Int. Cl.
*G10L 15/00*   (2013.01)
*G10L 15/22*   (2006.01)
(Continued)

(52) U.S. Cl.
CPC ........... *G10L 15/22* (2013.01); *G06F 16/634* (2019.01); *G06F 17/2785* (2013.01);
(Continued)

(58) Field of Classification Search
CPC .. G06F 17/2785; G06F 17/274; G06F 17/271; G06F 17/2765; G06F 17/30654;
(Continued)

(56) References Cited

U.S. PATENT DOCUMENTS

| 9,189,742 | B2 * | 11/2015 | London | G06F 16/90332 |
| 2003/0154072 | A1 * | 8/2003 | Young | H04M 3/51 |
| | | | | 704/9 |
| 2009/0204605 | A1 * | 8/2009 | Bai | G06F 16/3329 |
| 2014/0278415 | A1 * | 9/2014 | Ivanov | G10L 15/063 |
| | | | | 704/246 |

(Continued)

FOREIGN PATENT DOCUMENTS

JP    2003-248497    9/2003

OTHER PUBLICATIONS

Lin, B. S., Wang, H. M., & Lee, L. S. (1999). "A distributed architecture for cooperative spoken dialogue agents with coherent dialogue state and history."*

(Continued)

*Primary Examiner* — Edgar X Guerra-Erazo
(74) *Attorney, Agent, or Firm* — Oblon, McClelland, Maier & Neustadt, L.L.P.

(57) ABSTRACT

A language storage method according to one aspect of the present invention includes vectorization steps for vectorizing language accumulated in a dialog log database using a word vector created in advance for each word; determination step for determining whether to employ the language that has been vectorized as response data; and a storage step for accumulating the language that has been determined to be employed as the response data in a response database, in which a dimension reduction step for reducing the number of dimensions of the vector of the language vectorized in the vectorization step is included between the vectorization step and the determination step, and in the determination step, it is determined which one of an employed group and an unemployed group the vector of the language whose number of dimensions has been reduced in the dimension reduction step belongs to.

5 Claims, 8 Drawing Sheets

(51) Int. Cl.
  *G10L 13/00* (2006.01)
  *G10L 15/14* (2006.01)
  *G06F 16/632* (2019.01)
  *G06F 17/27* (2006.01)
  *H04L 12/58* (2006.01)
  *G10L 15/06* (2013.01)

(52) U.S. Cl.
  CPC .............. *G10L 13/00* (2013.01); *G10L 15/14* (2013.01); *H04L 51/02* (2013.01); *G10L 15/063* (2013.01); *G10L 2015/223* (2013.01)

(58) Field of Classification Search
  CPC ......... G06F 17/30976; G06F 17/30401; G06F 17/2881; G10L 15/22; G10L 15/197; G10L 15/04; G10L 15/18; G10L 15/1815; G10L 15/1822; G10L 15/183; G10L 15/265
  See application file for complete search history.

(56) References Cited

U.S. PATENT DOCUMENTS

2015/0142704 A1* 5/2015 London ............. G06F 16/90332
                                                                 706/11
2018/0005628 A1* 1/2018 Xue ........................ G06F 17/20
2018/0052884 A1* 2/2018 Kale ......................... G06N 5/04

OTHER PUBLICATIONS

Sato-Shimokawara, E. et al. "A cloud based chat robot using dialogue histories for elderly people" Proceedings of the 24th IEEE International Symposium on Robot and Human Interactive Communication, 2015, pp. 206-210.

Shwartz, V. "How do I visualise word2vec word vectors?", https://www.auora.com/How-do-I-visualise-word2vec-word-vectors, Mar. 26, 2016, pp. 1-3.

* cited by examiner

N1 PIECES OF DATA THAT
SHOULD BE EMPLOYED (TRAINING DATA)

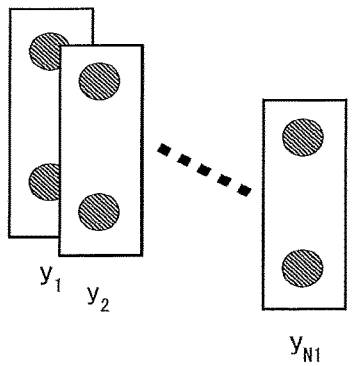

N2 PIECES OF DATA THAT
SHOULD BE UNEMPLOYED (TRAINING DATA)

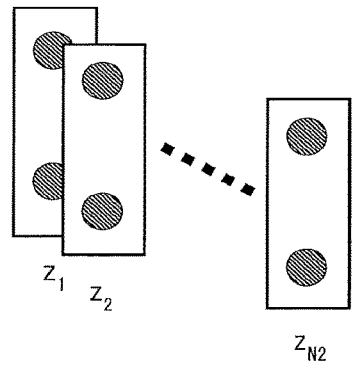

DETERMINATION EXPRESSION
$$z_n = 1/(1 + e^{-(\Sigma_l \alpha_l y_n(l))})$$

WHEN ILLUSTRATED BASED ON DETERMINATION EXPRESSION IN MIDDLE OF LEARNING,

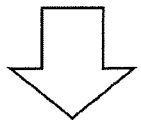

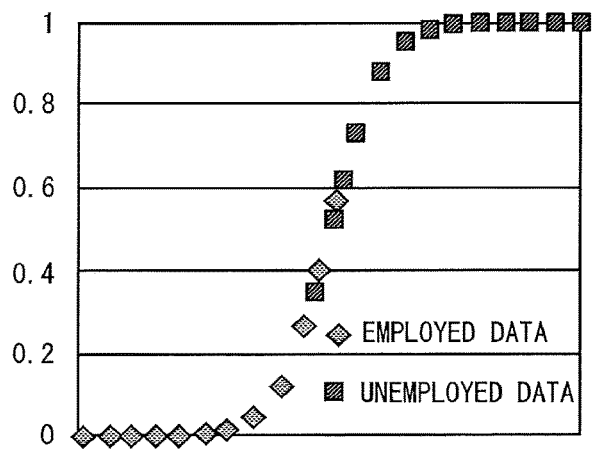

UPDATE AND LEARN $\alpha_l$ IN DETERMINATION EXPRESSION

DERIVE FUNCTION CAPABLE OF SEPARATING EMPLOYED DATA FROM UNEMPLOYED DATA

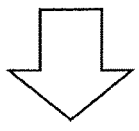

BY APPLYING LOW-DIMENSIONAL DATA CALCULATED IN STEP S4 TO DETERMINATION EXPRESSION AFTER LEARNING, IT IS DETERMINED WHETHER THIS LOW-DIMENSIONAL DATA SHOULD BE EMPLOYED

Fig. 6

LANGUAGE STORAGE METHOD AND LANGUAGE DIALOG SYSTEM

CROSS REFERENCE TO RELATED APPLICATIONS

This application is based upon and claims the benefit of priority from Japanese patent application No. 2016-242297, filed on Dec. 14, 2016, the disclosure of which is incorporated herein in its entirety by reference.

BACKGROUND

The present invention relates to a language storage method and a language dialog system, and relates to, for example, a language storage method performed in an interactive robot and a language dialog system using this method.

In recent years, many interactive robots have been proposed. An interactive robot outputs language in response to a speaker's (e.g., a user's) spoken language. The interactive robot selects language to be used for this response from language stored in a database. Accordingly, in order to improve interacting capabilities of the interactive robot, the amount of responding language that is stored needs to be increased. One example of the method of storing language is disclosed in Japanese Unexamined Patent Application Publication No. 2003-248497.

Japanese Unexamined Patent Application Publication No. 2003-248497 discloses, when a speaker says language that has not been registered in a recognition dictionary, asking, by a speaking unit, in which semantic attribute (e.g., cars, sports, or foods) this language belongs, and registering speech data of the language that has not been registered in the recognition dictionary in association with the result of recognizing the semantic attribute that has been obtained in a speech data dictionary. After the above language is registered in the speech data dictionary, when the speaker says language that has not been registered in the recognition dictionary, a system searches for speech data in the speech data dictionary that is the same as the language spoken by the speaker that is not registered in the recognition dictionary and continues, when this language exists in the speech data dictionary, dialog by replacing this speech data by the semantic attribute that has been obtained.

SUMMARY

In the dialog, a speaker's spoken language is not always appropriate for language that is used for a response. That is, in the interactive robot, the language that the robot should remember needs to be appropriately selected in order to improve the interacting capability. In the technique disclosed in Japanese Unexamined Patent Application Publication No. 2003-248497, however, it is impossible to determine that the speaker's spoken language should not be employed as the language to be stored in a response database.

It may be possible to select the language that the robot should remember by vectorizing the language obtained from the speaker and performing processing on this vector in order to determine whether to employ the language obtained from the speaker. However, a simple vectorization of language often causes a problem that the number of vectors of the language becomes enormous and it thus takes a lot of time to perform processing for determining whether to learn this language. Further, when the number of vectors of the language is reduced, the accuracy of the result of the determination whether to learn this language is reduced although the processing time becomes short.

The present invention has been made in view of the aforementioned background and aims to achieve both a reduction in time required to determine whether to remember the language obtained from the speaker and improvement of the accuracy of the determination whether to learn this language.

A language storage method according to one aspect of the present invention is a language storage method of accumulating a speaker's spoken language in a dialog log database and determining, by a calculation, whether to employ the language accumulated in the dialog log database as response data in a response database that stores language to be used for a response to the speaker's spoken language, the method including: a dialog log accumulation step for accumulating the speaker's spoken language in the dialog log database; a vectorization step for vectorizing the language accumulated in the dialog log database using a word vector created in advance for each word; a determination step for determining whether to employ the language that has been vectorized as the response data; and a storage step for accumulating the language that has been determined to be employed as the response data in the response database, in which a dimension reduction step for reducing the number of dimensions of the vector of the language vectorized in the vectorization step is included between the vectorization step and the determination step, in the determination step, it is determined which one of an employed group and an unemployed group the vector of the language whose number of dimensions has been reduced in the dimension reduction step belongs to, and in the storage step, the language that has been determined to belong to the employed group is accumulated in the response database.

According to the aforementioned aspect of the present invention, the language obtained from the speaker is converted into a vector accurately indicating the meaning of this language, the number of vectors of the language is then reduced, and it is determined whether to employ the language based on the vector whose number has been reduced, whereby it is possible to increase the speed of the processing of selecting the language to be stored in the response database and the accuracy of this processing.

The language storage method according to one aspect of the present invention reduces, in the dimension reduction step, the number of dimensions of the vector of the language in a state in which a global structure and a local structure of the vector of the language vectorized in the vectorization step is maintained.

According to the aforementioned aspect of the present invention, the global structure and the local structure of the vector are maintained in the dimension reduction step, whereby it is possible to further increase the accuracy of selecting the language to be stored in the response database.

The language storage method according to one aspect of the present invention reduces, in the dimension reduction step, the number of dimensions of the vector of the language using one of t-distributed Stochastic Neighbor Embedding (t-SNE), Stochastic Neighbor Embedding (SNE), and a principal component analysis.

The aforementioned aspect of the present invention discloses an example of a specific method for achieving a reduction in the number of vectors. It is possible to further increase the accuracy of selecting the language to be stored in the response database by reducing the number of vectors in a state in which the relation between the vectors is maintained.

The language storage method according to one aspect of the present invention determines whether to employ the language generated by the dimension reduction step using one of a Gaussian mixture model, a Support Vector Machine (SVM), and a logistic regression analysis leaned in such a way as to be able to classify language that should be employed and language that should not be employed prepared in advance.

According to the aforementioned aspect of the present invention, it is possible to increase the speed of performing the processing of determining whether to employ language or not by using the aforementioned learned classification method.

A language dialog system according to one aspect of the present invention includes: a speech recognizer configured to recognize a speaker's spoken language; a dialog log database configured to accumulate the language recognized by the speech recognizer; a response database configured to store the language to respond to the language recognized by the speech recognizer; a dialog controller configured to select the language to respond to the language recognized by the speech recognizer from the response database; a speech synthesizer configured to convert the language selected by the dialog controller into a speech signal; and a response database creation module configured to determine whether to employ the language accumulated in the dialog log database as language that should be accumulated in the response database, in which the response database creation module performs the following processing of: a vectorization step for vectorizing the language accumulated in the dialog log database using a word vector created in advance for each word; and a dimension reduction step for reducing the number of dimensions of the vector of the language vectorized in the vectorization step; a determination step for determining whether to employ the language whose number of dimensions of the vector has been reduced by the dimension reduction step as the response data; and a storage step for accumulating the language that has been determined to be employed as the response data to be stored in the response database in the response database, and in the determination step, it is determined which one of an employed group and an unemployed group the vector of the language whose number of dimensions has been reduced in the dimension reduction step belongs to, and in the storage step, the language that has been determined to belong to the employed group is accumulated in the response database.

According to the aforementioned aspect of the present invention, the language obtained from the speaker is converted into a vector that appropriately indicates the meaning of this language, then the number of vectors of the language is reduced, and then it is determined whether to employ the language based on the vector whose number has been reduced, whereby it is possible to increase the speed of the processing of selecting the language to be stored in the response database and the accuracy of this processing.

According to the language storage method and the language dialog system of the present invention, it is possible to increase the speed of learning by the classifier that classifies the language to be stored and the language that should not be stored.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 6 is a diagram for describing learning of a function and classification processing when a logistic regression analysis is used as the classification processing of the language dialog system according to the first embodiment;

DESCRIPTION OF EMBODIMENTS

First Embodiment

Hereinafter, with reference to the drawings, an embodiment of the present invention will be explained. For the sake of clarification of the explanation, the following descriptions and the drawings are omitted and simplified as appropriate. Throughout the drawings, the same elements are denoted by the same reference symbols, and overlapping descriptions will be omitted as appropriate.

A language dialog system 1 according to the first embodiment is, for example, mounted on an interactive robot. The language dialog system 1 according to the first embodiment accumulates a speaker's spoken language in a dialog log database and determines, by a calculation, whether to employ the language accumulated in this dialog log database as response data in a response database that stores language to be used for a response to the speaker's spoken language. That is, the language dialog system 1 according to the first embodiment increases the amount of language to be stored in the response database based on the speaker's spoken language. Accordingly, the language dialog system 1 according to the first embodiment increases the amount of response data that can be used for the response as this system is used more and more, whereby interacting capabilities can be improved.

Figure 1:
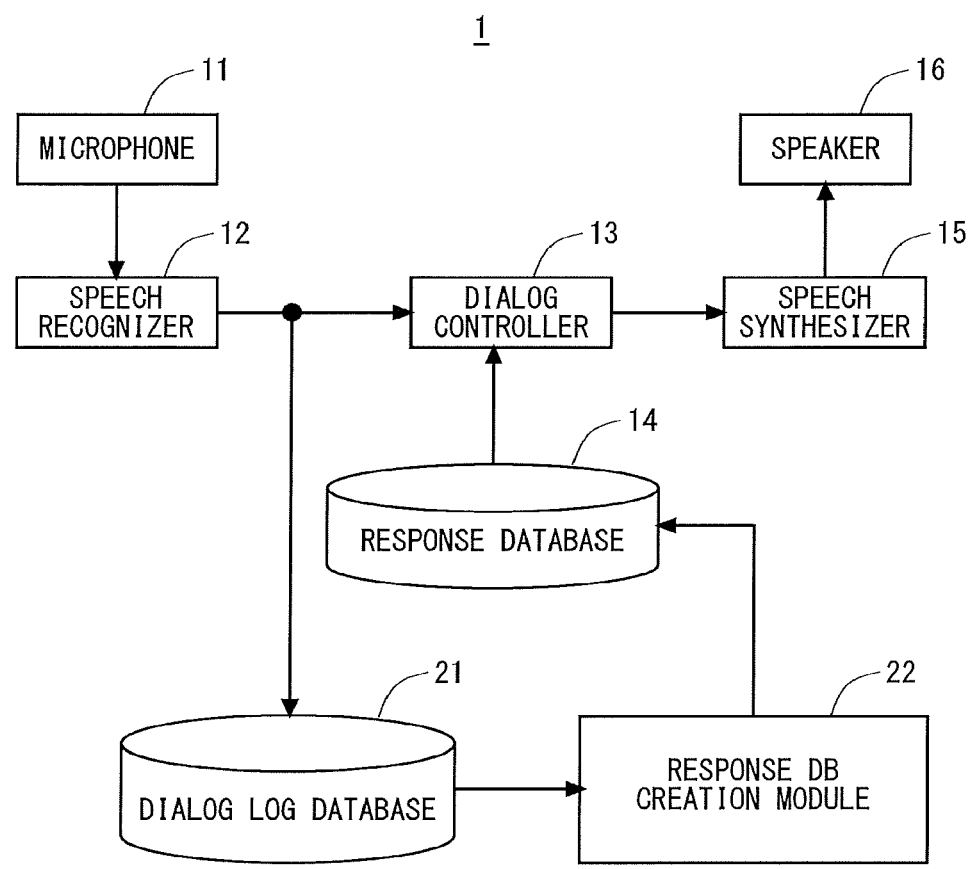
FIG. 1 is a block diagram for describing a processing system of a language dialog system according to a first embodiment.

FIG. 1 shows a block diagram for describing a processing system in the language dialog system 1 according to the first embodiment. The language dialog system 1 according to the first embodiment includes a microphone 11, a speech recognizer 12, a dialog controller 13, a response database 14, a speech synthesizer 15, a speaker 16, a dialog log database 21, and a response database creation module 22.

The microphone 11 receives the speaker's spoken language in the language dialog system 1 as speech signals. The speech recognizer 12 recognizes the speech signals input via the microphone 11 and outputs them to the dialog controller 13 and the dialog log database 21. The speech recognizer 12 generates, for example, text information that indicates the speaker's spoken language from the input speech signals and outputs this text information to the dialog controller 13 and the dialog log database 21. Further, the speech recognizer 12 recognizes the speaker's spoken language as a sentence.

The dialog controller 13 selects response data that corresponds to the language given by the speech recognizer 12 from the response database 14 and outputs the selected response data to the speech synthesizer 15. The response database 14 stores the language (e.g., response data) to respond to the language recognized by the speech recognizer 12. The speech synthesizer 15 converts the response data given by the dialog controller 13 into speech signals and outputs the speech signals to the speaker 16. The speaker 16 outputs a response speech based on the given speech signals.

The dialog log database 21 accumulates the speaker's language given by the speech recognizer 12. The response database creation module 22 determines whether to employ the language accumulated in the dialog log database as the language to be accumulated in the response database 14. One of the characteristics of the language dialog system 1 according to the first embodiment is operations of the response database creation module 22. Thus, in the following description, operations of the response database creation module 22 will be explained in detail.

First, the response database creation module 22 may be composed of a CPU, a memory, and other circuits in hardware and may be implemented by programs loaded in the memory in software. Those skilled in the art will therefore understand that the response database creation module 22 may be implemented in various ways by only hardware, only software, or the combination thereof without any limitation. Throughout the drawings, the same components are denoted by the same reference symbols and overlapping descriptions will be omitted as appropriate.

The aforementioned program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 2:
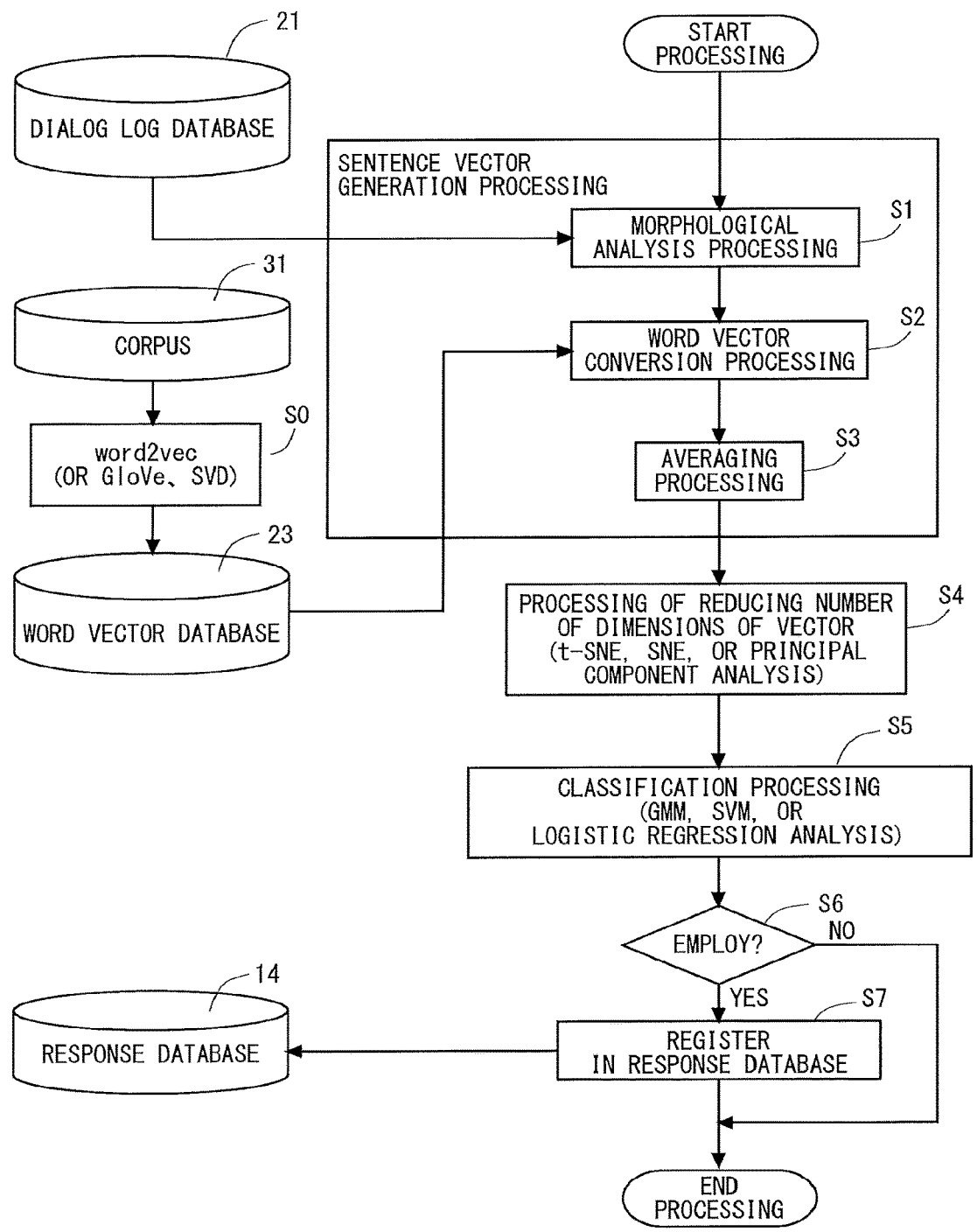
FIG. 2 is a flowchart for describing processing in a response database creation module of the language dialog system according to the first embodiment.

Next, processing performed in the response database creation module 22 will be explained. FIG. 2 shows a flowchart for describing processing in the response database creation module 22 in the language dialog system 1 according to the first embodiment. The processing shown in FIG. 2 is performed after the dialog log accumulation step in which the language spoken by the speaker are accumulated in the dialog log database 21 or in parallel with the dialog log accumulation step.

As shown in FIG. 2, the response database creation module 22 performs, after starting processing, sentence vector generation processing (e.g., vectorization step) for vectorizing the language stored in the dialog log database 21 by units of sentences. Further, this sentence vector generation processing can be decomposed into three kinds of processing.

In sentence vector generation processing, first, morphological analysis processing in which the language to be processed (e.g., sentence) is selected from the dialog log database 21 and this language is decomposed into the words included in the selected sentence is performed (Step S1). Next, word vector conversion processing for vectorizing the words decomposed by the morphological analysis processing by units of words is performed (Step S2). In this word vector conversion processing, the words included in the sentence are vectorized based on the word vector data accumulated in the word vector database 23 included in the response database creation module 22. Further, the word vector data accumulated in the word vector database 23 is created using a tool such as word2bec that performs processing for vectorizing the word from a language corpus 31 in which language has been accumulated.

The tool word2vec expresses the characteristics of the words based on the hypothesis that the words used in the same context have the same meaning. Since word2vec vectorizes the words based on this hypothesis, the words can be vectorized in view of characteristics of the words and the semantic structures thereof, and the words can be vectorized in such a manner that words semantically close to each other are present close to each other in a space. Further, by vectorizing the words based on this method, it is possible to extract synonyms and perform subtraction or addition of words.

Methods such as Global Vectors for Word Representation (Glove) and Singular Value Decomposition (SVD) may be employed as a method of vectorizing the words.

Next, in the sentence vector generation processing, averaging processing is performed (Step S3). While processing for vectorizing the words included in the sentence is performed in Step S2, since a sentence includes a plurality of words, a conversion is carried out in such a way that one sentence is expressed by a group of vectors by this averaging processing. Specifically, in this averaging processing, weighted average processing in which weighting for each word based on the structure of the sentence is performed and an average value is calculated from this weight and the vector of each word is performed. Further, as another method of the sentence vector generation processing, the sentence vector may be calculated using a Recurrent Neural Network (RNN).

Next, the response database creation module 22 performs processing of reducing the number of dimensions of the vector (e.g., dimension reduction step) for reducing the number of dimensions of the sentence vector generated in the sentence vector generation processing (Step S4). The details of the processing of reducing the number of dimensions of the vector will be explained later.

Next, the response database creation module 22 performs classification processing for determining whether to employ the vectorized language as the response data (e.g., determination step) (Step S5) and storage processing (e.g., storage step) for accumulating the language that has been determined to be employed as the response data in the response database (Steps S6 and S7). More specifically, when it is determined by the classification processing that language should be employed as the response data, the response database creation module 22 registers the language that has been determined to be employed in the response database 14 and the process is ended (Steps S6 and S7). On the other hand, when it is determined in the classification processing that the language should not be employed as the response data, the response database creation module 22 discards the language to be processed and the process is ended (Step S6). The details of the classification processing will be described later.

Now, processing of reducing the number of dimensions of the vector in Step S4 will be described in detail. In this processing of reducing the number of dimensions of the vector, the number of dimensions of the vector of the sentence is reduced in a state in which the global structure and the local structure of the vector of the language (e.g., sentence) vectorized by the sentence vector generation processing are maintained. Methods such as t-distributed Stochastic Neighbor Embedding (t-SNE), Stochastic Neighbor Embedding (SNE), and a principal component analysis may be used for the processing of reducing the number of dimensions of the vector. In the following description, an example of the processing when t-SNE is used in the processing of reducing the number of dimensions of the vector will be explained.

Figure 3:
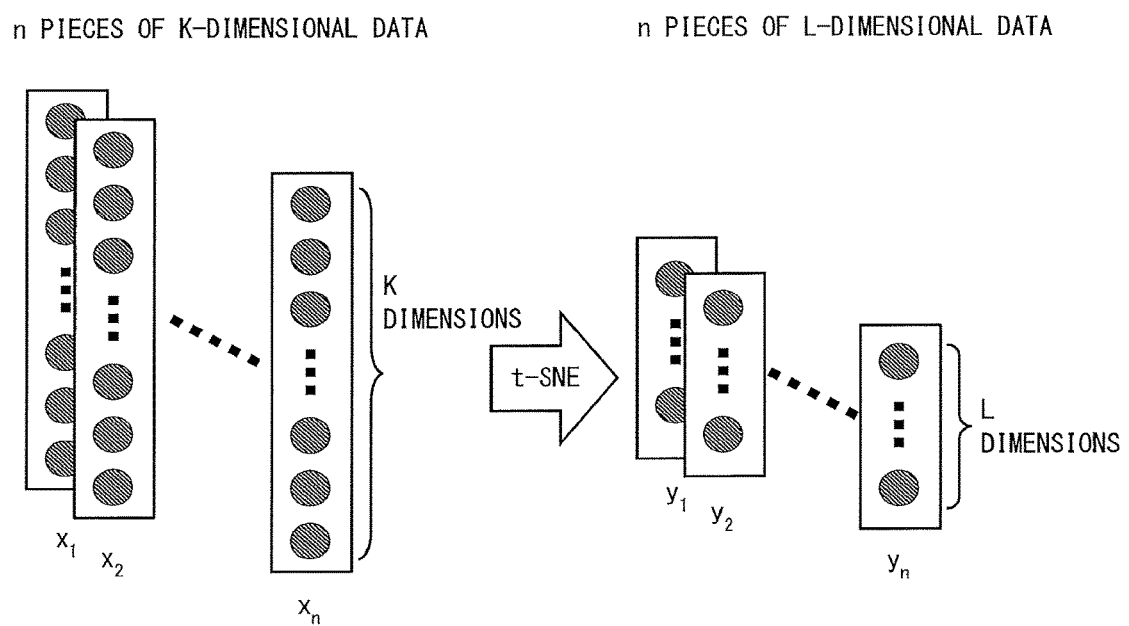
FIG. 3 is a diagram for describing the outline of processing of reducing the number of dimensions of a vector in the language dialog system according to the first embodiment.

FIG. 3 shows a diagram for describing the outline of the processing of reducing the number of dimensions of the vector in the language dialog system according to the first embodiment. As shown in FIG. 3, in the processing of reducing the number of dimensions of the vector, n pieces of high-dimensional data ($x_1$-$x_n$ in FIG. 3) are converted into n pieces of low-dimensional data ($y_1$-$y_n$ in FIG. 3). Accordingly, the number of dimensions of each data (e.g., sentence) is reduced from K dimensions to L (L<K) dimensions.

Figure 4:
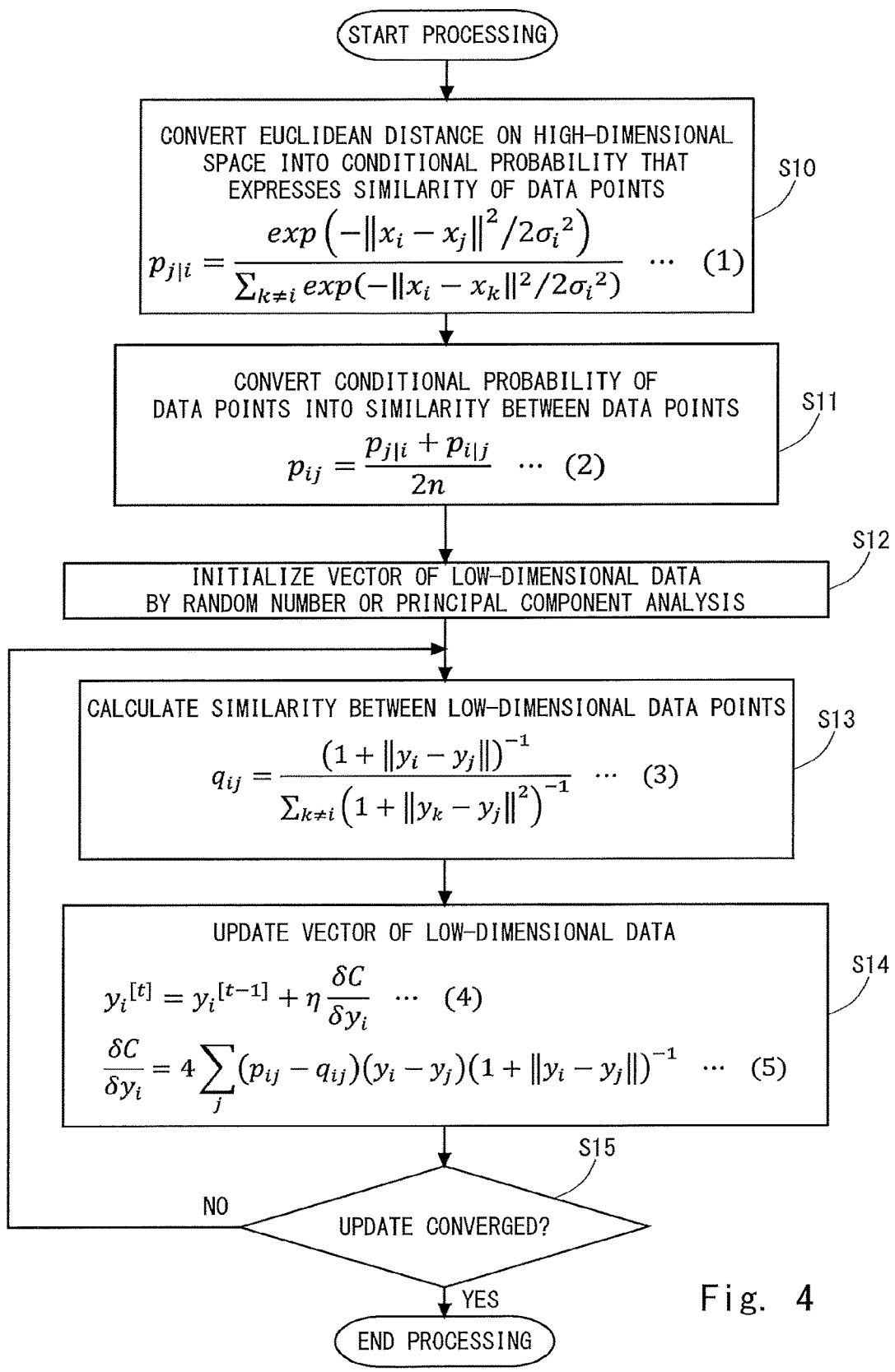
FIG. 4 is a flowchart for describing a process flow of t-SNE, which is one example of the processing of reducing the number of dimensions of the vector in the language dialog system according to the first embodiment.

FIG. 4 shows a flowchart for describing a process flow of t-SNE, which is one example of the processing of reducing the number of dimensions of the vector in the language dialog system according to the first embodiment. In the Expressions shown in FIG. 4, x denotes data before the processing of reducing the number of dimensions of the vector, and y denotes data after the processing of reducing the number of dimensions of the vector. Further, each of i, j, and k is the number of the data to be processed, and σ is a variance of a Gaussian distribution with $x_i$ as the center thereof. Further, it is assumed that the number of pieces of data to be processed is n.

As shown in FIG. 4, in the processing of reducing the number of dimensions of the vector, first, a Euclidean distance on the high-dimensional space between a data point xi and a data point xj is converted into a conditional probability $p_{i|j}$ that expresses the similarity of the data points (Step S10). In Step S10, processing is carried out based on the following Expression (1).

$$p_{j|i} = \frac{\exp(-\|x_i - x_j\|^2/2\sigma_i^2)}{\sum_{k \neq i} \exp(-\|x_i - x_k\|^2/2\sigma_i^2)} \quad (1)$$

Next, in the processing of reducing the number of dimensions of the vector, a similarity $p_{ij}$ between the data points is calculated using the probability calculated in Step S10 (Step S11). This conversion is carried out based on the following Expression (2).

$$p_{ij} = \frac{p_{j|i} + p_{i|j}}{2n} \quad (2)$$

Next, in the processing of reducing the number of dimensions of the vector, the vector of the data point y temporarily created is initialized by a random number or a principal component analysis (Step S12). After that, in the processing of reducing the number of dimensions of the vector, a similarity $q_{ij}$ between data y initialized in Step S11 is calculated using the following Expression (3) (Step S13).

$$q_{ij} = \frac{(1 + \|y_i - y_j\|)^{-1}}{\sum_{k \neq i}(1 + \|y_k - y_j\|^2)^{-1}} \quad (3)$$

Next, in the processing of reducing the number of dimensions of the vector, the vector value of the data point y is updated using the following Expressions (4) and (5) (Step S14).

$$y_i^{[t]} = y_i^{[t-1]} + \eta \frac{\delta C}{\delta y_i} \quad (4)$$

$$\frac{\delta C}{\delta y_i} = 4\sum_j (p_{ij} - q_{ij})(y_i - y_j)(1 + \|y_i - y_j\|)^{-1} \quad (5)$$

When the result of updating the data point y in Step S14 is converged, the data point y having a converged vector value is output as a sentence vector after the processing of reducing the number of dimensions of the vector (Step S10). On the other hand, when the result of updating the data point y in Step S14 is not converged, the process goes back to Step S13, and processing of Step S13 and the following processing are performed on the data point y having the updated vector value (Step S10).

Next, the classification processing of Step S5 shown in FIG. 2 will be explained. In the classification processing, it is determined whether to employ the language generated in the processing of reducing the number of dimensions of the vector in Step S4 using one of a Gaussian mixture model (GMM), a Support Vector Machine (SVM), and a logistic regression analysis learned in such a way as to be able to classify the language that should be employed and the language that should not be employed prepared in advance. In the following description, learning of the model, and the classification processing when the Gaussian mixture model is used and those when the logistic regression analysis is used will be explained.

Figure 5:
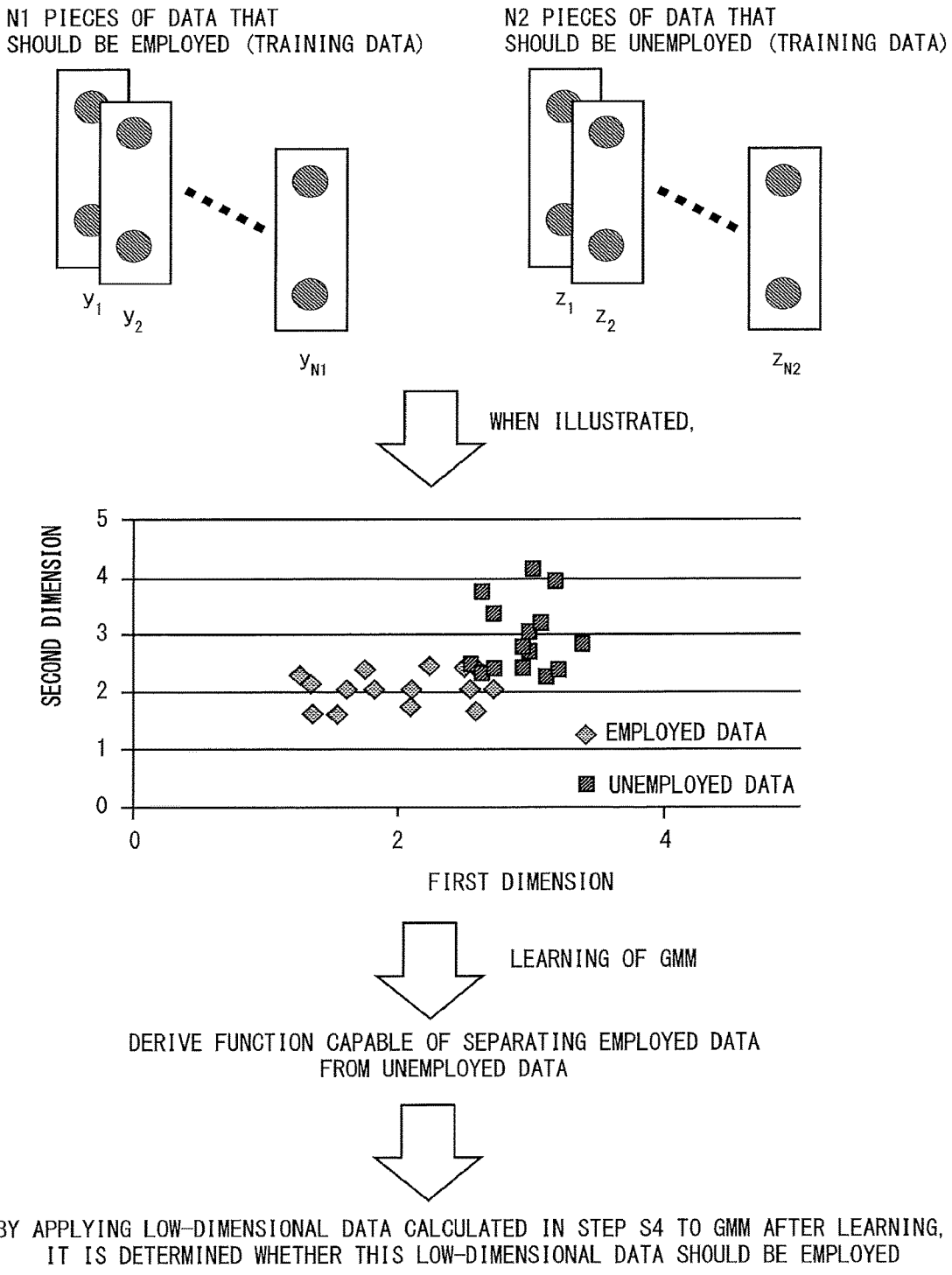
FIG. 5 is a diagram for describing learning of a function and classification processing when GMM is used as classification processing of the language dialog system according to the first embodiment.

First, FIG. 5 shows a diagram for describing learning of the function and classification processing when the GMM is used as the classification processing of the language dialog system according to the first embodiment. As shown in FIG. 5, the GMM learns the model using a plurality of pieces of training data. In the example shown in FIG. 5, N1 pieces of data that should be employed and N2 pieces of data that should be unemployed are prepared as training data. FIG. 5 shows two-dimensional data as the training data. When this training data is illustrated on a two-dimensional graph, it is understood that the vector values vary to some extent. That is, the data that should be employed are classified into an employed group and the data that should be unemployed are classified into an unemployed group. In the learning in the classification processing, the range of the employed group and the range of the unemployed group are defined by learning. Further, in the classification processing, whether to employ the data or not is determined based on whether the data to be input belongs to the employed group or the unemployed group defined by learning.

In the learning of GMM, the function of GMM capable of classifying the employed data and the unemployed data is derived. By giving the low-dimensional data (e.g., data y) calculated in Step S4 to the GMM after the calculation, a difference is generated in the result of the calculation in the GMM, and it is possible to determine whether the data y should be employed based on this difference.

Next, FIG. 6 shows a diagram for describing learning of the function and classification processing when the logistic regression analysis is used as the classification processing of the language dialog system according to the first embodiment. As shown in FIG. 6, in the logistic regression analysis as well, model learning is performed using a plurality of pieces of training data, similar to the case in which the GMM is used. When this training data is illustrated on a graph with Expression (6), which is a discriminant of the logistic regression analysis, it is understood that the results of the determination vary to some extent. Accordingly, in the learning in the classification processing, the range of the employed group and the range of the unemployed group are defined by learning. Further, in the classification processing, whether to employ the data is determined based on whether the data to be input belongs to the employed group or the unemployed group defined by learning.

$$z_n = 1/(1+e^{-(\Sigma_l \alpha_l y_n(l))}) \quad (6)$$

In the learning of the logistic regression analysis, $\alpha_l$ of a determination expression capable of classifying the employed data and the unemployed data is derived. By applying the low-dimensional data (e.g., data y) calculated in Step S4 to the determination expression after the learning, a difference is generated in the result of the calculation of the determination expression, whereby it is possible to determine whether the data y should be employed based on this difference.

Next, the speed and the accuracy of the language learning in the language dialog system 1 according to the first embodiment will be explained. In this example, a language dialog system including a response database creation module that does not perform the processing of reducing the number of dimensions of the vector is shown as a comparative example.

Figure 7:
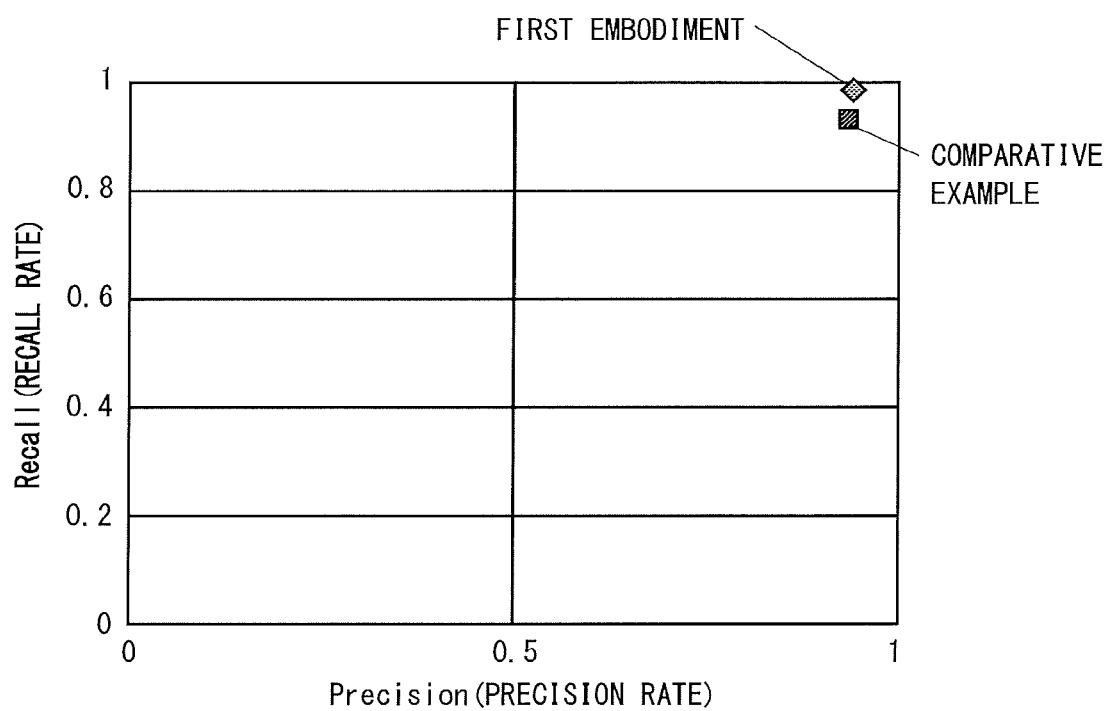
FIG. 7 is a graph for describing accuracy of language to be stored in the language dialog system according to the first embodiment.

First, FIG. 7 shows a graph for describing the accuracy of the language to be stored in the language dialog system 1 according to the first embodiment. In the graph shown in FIG. 7, the horizontal axis indicates a precision rate indicating the rate that the sentence that should be determined to be employed is not included in the results determined not to be employed, and the vertical axis indicate a recall rate indicating the rate of how accurately the sentence that should be unemployed was successfully unemployed. As shown in FIG. 7, it will be understood that the language dialog system 1 according to the first embodiment is able to achieve the precision rate that is equivalent to that of the language dialog system according to the comparative example and the recall rate that is higher than that of the language dialog system according to the comparative example.

Figure 8:
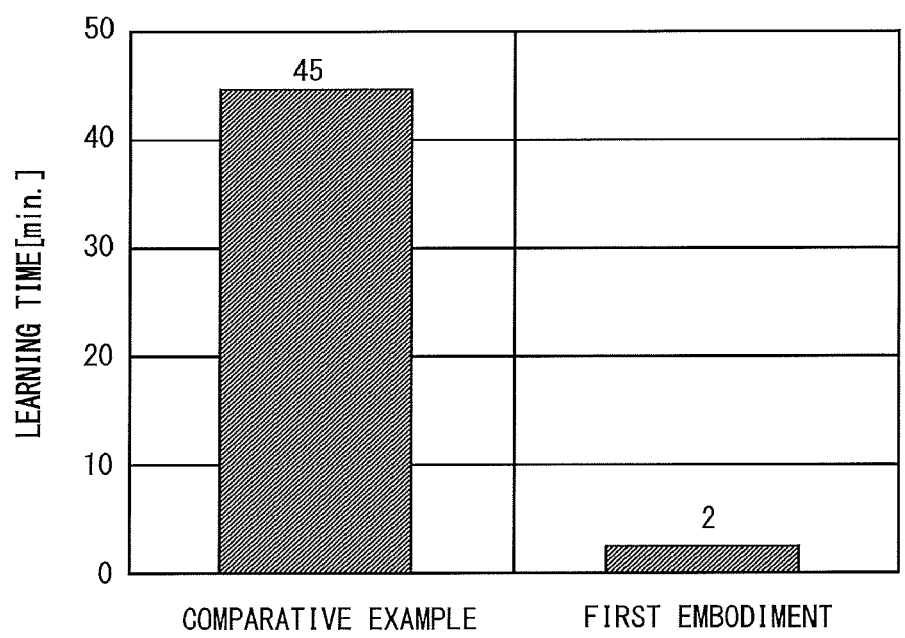
FIG. 8 is a graph for describing language learning time in the language dialog system according to the first embodiment.

FIG. 8 shows a graph for describing language learning time in the language dialog system 1 according to the first embodiment. The graph shown in FIG. 8 is a result of performing determination regarding whether each of 3800 sentences should be employed or unemployed. As shown in FIG. 8, while it takes 45 minutes to determine 3800 sentences in the language dialog system according to the comparative example, the language dialog system 1 according to the first embodiment determines 3800 sentences in two minutes.

From the aforementioned description, the language dialog system 1 according to the first embodiment includes the response database creation module 22 that performs processing of reducing the number of dimensions of the vector, thereby increasing the accuracy and the speed of the learning processing for learning new language.

Further, the response database creation module 22 reduces, in the processing of reducing the number of dimensions of the vector, the number of dimensions of the vector of the language in a state in which the global structure and the local structure of the vector of the language vectorized by the sentence vector generation processing are maintained using the method such as t-SNE. It is therefore possible to increase the learning accuracy.

Further, the response database creation module 22 is able to increase the speed of processing of determining whether to employ the language by using the classification processing in which the learned function is applied to the data whose dimension has been reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A language storage method of accumulating a speaker's spoken language in a dialog log database and determining, by a calculation, whether to employ language accumulated in the dialog log database as response data in a response database that stores language to be used for a response to the speaker's spoken language, the method comprising:
   a dialog log accumulation step for accumulating the speaker's spoken language in the dialog log database;
   a vectorization step for vectorizing the language accumulated in the dialog log database using a word vector created in advance for each word;
   a determination step for determining whether to employ the language that has been vectorized as the response data; and
   a storage step for accumulating the language that has been determined to be employed as the response data in the response database, wherein
   a dimension reduction step for reducing the number of dimensions of the vector of the language vectorized in the vectorization step is included between the vectorization step and the determination step,
   in the determination step, it is determined which one of an employed group and an unemployed group the vector of the language whose number of dimensions has been reduced in the dimension reduction step belongs to, and
   in the storage step, the language that has been determined to belong to the employed group is accumulated in the response database.

2. The language storage method according to claim 1, wherein, in the dimension reduction step, the number of dimensions of the vector of the language is reduced in a state in which a global structure and a local structure of the vector of the language vectorized in the vectorization step is maintained.

3. The language storage method according to claim 1, wherein, in the dimension reduction step, the number of dimensions of the vector of the language is reduced using one of t-distributed Stochastic Neighbor Embedding (t-SNE), Stochastic Neighbor Embedding (SNE), and a principal component analysis.

4. The language storage method according to claim 1, wherein, in the determination step, it is determined whether to employ the language generated by the dimension reduction step using one of a Gaussian mixture model, a Support Vector Machine (SVM), and a logistic regression analysis leaned in such a way as to be able to classify language that should be employed and language that should not be employed prepared in advance.

5. A language dialog system comprising:
   a speech recognizer configured to recognize a speaker's spoken language;
   a dialog log database configured to accumulate the language recognized by the speech recognizer;
   a response database configured to store the language to respond to the language recognized by the speech recognizer;
   a dialog controller configured to select the language to respond to the language recognized by the speech recognizer from the response database;
   a speech synthesizer configured to convert the language selected by the dialog controller into a speech signal; and
   a response database creation module configured to determine whether to employ the language accumulated in the dialog log database as language that should be accumulated in the response database, wherein
the response database creation module performs the following processing of:
   a vectorization step for vectorizing the language accumulated in the dialog log database using a word vector created in advance for each word; and
   a dimension reduction step for reducing the number of dimensions of the vector of the language vectorized in the vectorization step;
   a determination step for determining whether to employ the language whose number of dimensions of the vector has been reduced by the dimension reduction step as the response data; and
   a storage step for accumulating the language that has been determined to be employed as the response data to be stored in the response database in the response database, and
in the determination step, it is determined which one of an employed group and an unemployed group the vector of the language whose number of dimensions has been reduced in the dimension reduction step belongs to, and
in the storage step, the language that has been determined to belong to the employed group is accumulated in the response database.

* * * * *